United States Patent
Van Peursem

[19]

[11] Patent Number: 6,154,842

[45] Date of Patent: Nov. 28, 2000

[54] METHOD AND SYSTEM FOR REDUCING TIME AND POWER REQUIREMENTS FOR EXECUTING COMPUTER-READABLE INSTRUCTION STREAMS IN AN EXECUTION ENVIRONMENT HAVING RUN-TIME SECURITY CONSTRAINTS

[75] Inventor: James E. Van Peursem, Hanover Park, Ill.

[73] Assignee: Motorola, Inc., Schaumburg, Ill.

[21] Appl. No.: 09/170,554

[22] Filed: Oct. 13, 1998

[51] Int. Cl.[7] .............................. G06F 11/30; H04L 9/00
[52] U.S. Cl. ............................. 713/200; 709/331
[58] Field of Search .................... 713/200, 201; 709/305, 331, 332; 364/222.5, 286.4

[56] References Cited

U.S. PATENT DOCUMENTS

| | | | |
|---|---|---|---|
| 5,937,411 | 8/1999 | Becker | 707/103 |
| 5,951,636 | 9/1999 | Zerber | 709/202 |
| 5,966,702 | 10/1999 | Fresko et al. | 707/1 |

OTHER PUBLICATIONS

Jaworski, "JAVA 1.1 Developer's Guide 2nd Edition," Sams.net, pp. 12–24, 750–771, 992–999, Dec. 1997.
Newman et al., "Special Edition Using Java," Que, pp. 595–596, Dec. 1996.

*Primary Examiner*—Dieu-Minh T. Le
*Attorney, Agent, or Firm*—Terri S. Hughes; Romi N. Bose

[57] ABSTRACT

A computer-readable instruction stream is verified to determine that it does not violate the run-time security constraints of the execution environment (150). The computer-readable instruction stream after verification is stored in a storage device (140). The execution environment (150) retrieves the computer-readable instruction stream from the storage device (14) and verifies that the computer-readable instruction stream has not been modified. Upon verification, the computer-readable instruction stream is executed, while bypassing verification of the run-time security constraints of the execution environment (150).

20 Claims, 2 Drawing Sheets

METHOD AND SYSTEM FOR REDUCING TIME AND POWER REQUIREMENTS FOR EXECUTING COMPUTER-READABLE INSTRUCTION STREAMS IN AN EXECUTION ENVIRONMENT HAVING RUN-TIME SECURITY CONSTRAINTS

FIELD OF THE INVENTION

The present invention relates to a method and system for reducing time and power requirements for executing computer-readable instruction streams in an execution environment having run-time security constraints.

BACKGROUND OF THE INVENTION

The Java™ programming and execution environment, created by Sun Microsystems, provides a popular way to write, distribute, and execute programs for many platforms. One of the attractive features in the Java™ execution environment is the built-in security system that enforces a set of security constraints on every program executed while in the execution environment. Through this mechanism, an execution environment can safely execute Java™ programs from unknown origins without risk of the program having adverse affects on the execution environment.

The enforcement of these security constraints places an added burden on the execution environment to execute the built-in security system because the set of security constraints is performed every time a class file is loaded into the execution environment, thus increasing time and power requirements. It is important to note that platforms with limited computing resources are especially sensitive to this added burden. For example, these security constraints are particularly troublesome in environments, such as web browsers, where computer-readable instruction streams are downloaded to the execution environment, but not permanently stored in the execution environment. Since the computer-readable instruction streams are not permanently stored in the execution environment, they have to be downloaded each time they are accessed, which adds the requirement for the verification process to be performed each time the computer-readable instruction streams are downloaded in the execution environment.

Thus, there exists a need for a method and apparatus that reduces the time and power requirements for executing computer-readable instruction streams in the execution environment having run-time security constraints while maintaining the safety of the execution environment executing computer-readable instruction streams from unknown origins without risk of the computer-readable instruction streams having adverse affects on the execution environment.

BRIEF DESCRIPTION OF THE DRAWINGS

A preferred embodiment of the present invention is now described, by way of example only, with reference to the accompanying drawings in which.

DETAILED DESCRIPTION OF THE PREFERRED EMBODIMENT

A method and system that reduces the time and power requirements for executing computer-readable instruction streams in an execution environment having run-time security constraints, while maintaining the safety of the execution environment executing computer-readable instruction streams from an unknown origin without risk of the computer-readable instruction stream having adverse affects on the execution environment is described herein. The preferred embodiment of the present invention is applicable to any execution environment having run-time security constraints, including the Java™ Virtual Machine created by Sun Microsystems.

Figure 1:
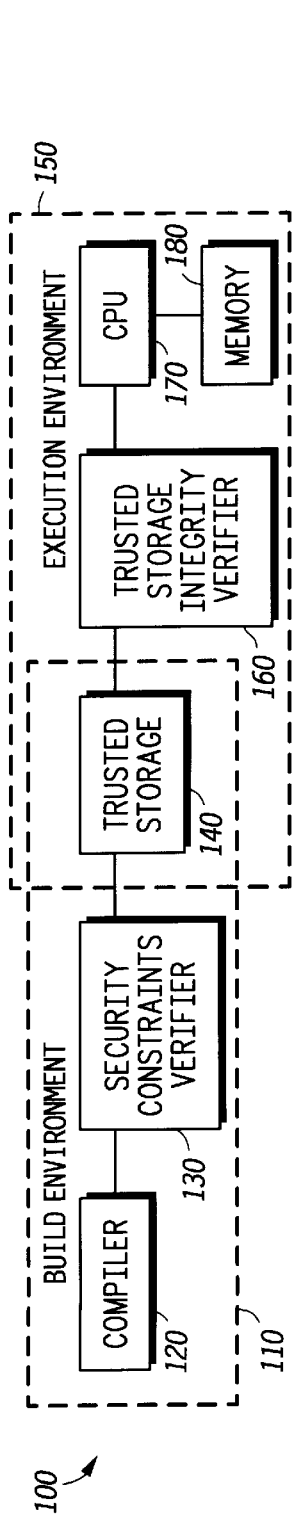
FIG. 1 is a block diagram of a system according to the preferred embodiment of the present invention.

FIG. 1 illustrates a system 100 for reducing; time and power requirements for executing computer-readable instruction streams in an execution environment 150 having run-time security constraints. The system 100 comprises a build environment 110 and an execution environment 150.

The build environment 110 of the system 100 comprises a compiler 120 and a security constraints verifier 130. The compiler 120 creates a computer-readable instruction stream. The security constraints verifier 130, coupled to the compiler 120, verifies that the computer-readable instruction stream does not violate the run-time security constraints of the execution environment 150. The run-time security constraints are execution environment specific. For example, in the specific case of Java™ programming, the verification tool performs the class file and/or bytecode verification process, which is a multi-pass process with each pass performing a specific set of checks. In the first pass, the basic structural integrity of the class file is checked. In a second pass, a series of checks are made for simple problems, such as invalid constant pool items or incorrect object inheritance problems. In a third pass, data-flow analysis is performed on each method in the code so that regardless of what path is taken through the method, a set of constraints always hold. These constraints include the sizes of operand stacks, which must not grow beyond system limits, and the number and types of arguments in which the methods are invoked. In addition, there are a series of checks that can be performed either in conjunction with the third pass, or optionally in a fourth pass, that include violations to language-level security restrictions, assignment of objects to mismatched field types, and verification that methods being called actually exist.

Preferably, a "trusted" storage device 140 is shared between the build environment 110 and the execution environment 150. The "trusted" storage device 140 is coupled between the security constraints verifier 130 in the build environment 110 and a "trusted" storage integrity verifier 160 (described in detail below) in the execution environment 150. The "trusted" storage device 140 stores the computer-readable instruction stream such that it cannot be modified without detection. It should be noted that the "trusted" storage device 140 can subsequently be moved to any other suitable location within the system 100, such as a server 200 (described in detail below with reference to FIG. 2). Some examples of a "trusted" storage device 140 are a read-only memory (ROM) or in archive with a digital signature attached. In the context of Java™ programming, a Java™ Archive (JAR) file can be used as a "trusted" storage device 140. Those skilled in the art will recognize a number of other mechanisms that can be used for the "trusted" storage mechanism within the scope and spirit of the present invention.

The execution environment 150 is, but not limited to, a normal central processing unit (CPU) or a byte-code interpreted environment. The execution environment 150 of the system 100 comprises a "trusted" storage integrity verifier 160, a CPU 170 and a memory 180. The CPU 170 is coupled to the "trusted" storage integrity verifier 160 and the memory 180 is coupled to the CPU 170. Before the execution environment 150 executes the computer-readable instruction stream, the execution environment 150 retrieves the computer-readable instruction stream from the "trusted" storage device 14 and the "trusted" storage integrity verifier 160 verifies the integrity of the "trusted" storage device 140 to insure that the computer-readable instruction stream has not been modified after being placed in the "trusted" storage device 140.

If the integrity of the "trusted" storage device 140 cannot be verified, it is assumed that the computer-readable instruction stream has been modified after being placed in the "trusted" storage device 140, and needs to be re-verified of the conformity to the run-time security constraints before execution in the execution environment 150. If the integrity of the "trusted" storage device 140 is verified (i.e., the computer-readable instruction stream has not been modified since stored in the "trusted" storage device 140), the computer-readable instruction stream is executed without additional verification of the run-time security constraints.

When the CPU 170 executes the computer-readable instruction stream, the verification of the run-time security constraints are bypassed. Bypassing verification of the run-time security constraints of the computer-readable instruction stream in the execution environment 150, after determining that the computer-readable instruction stream has not been modified after being placed in the "trusted" storage device 140, reduces time and power requirements for the execution environment 150 while still retaining a high level of security.

Figure 2:
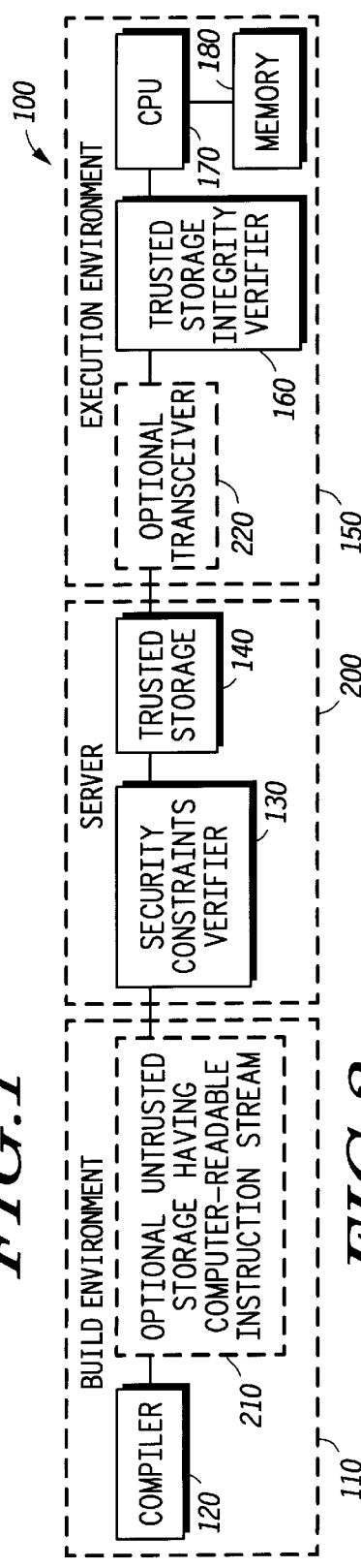
FIG. 2 is a block diagram of the system according to an alternative embodiment of the present invention.
Figure 3:
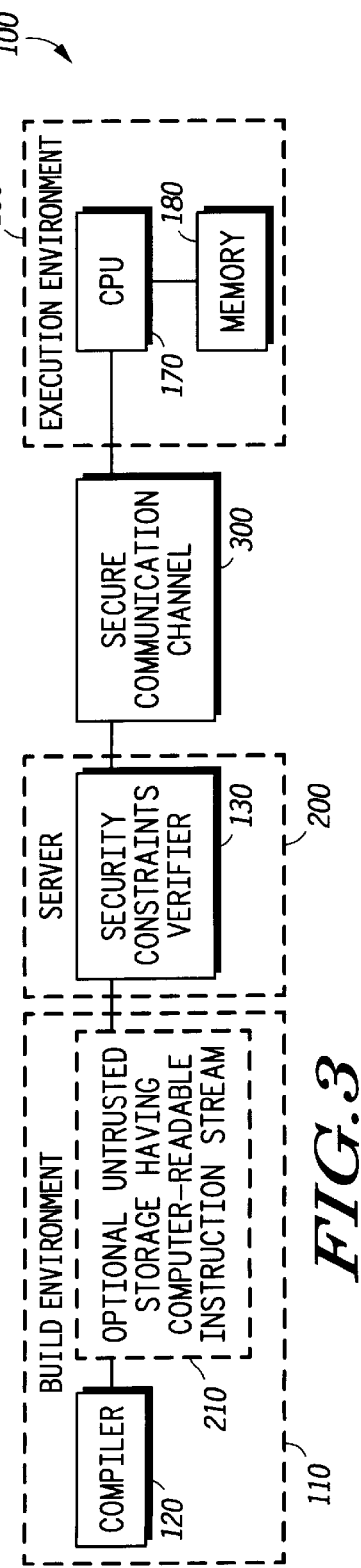
FIG. 3 is a block diagram of the system according to a further alternative embodiment of the present invention.

Alternatively, the system 100 can comprise a server 200 as illustrated in FIG. 2. In such a configuration, the compiler 120 remains located in the build environment 110 and the security constraints verifier 120 and the "trusted" storage device 140 are located on the server 200. The server 200 can send the "trusted" storage device 140 to the execution environment 150 for execution of the computer-readable instruction stream, or alternatively, as shown in FIG. 3, the server 200 can send the computer-readable instruction stream directly to the execution environment 150 via a secure communications channel 300.

The build environment 110 can optionally comprise an "untrusted" storage 210 for storing the computer-readable instruction stream prior to determining if the computer-readable instruction stream violates the run-time security constraints; of the execution environment 150.

Further, the execution environment can optionally comprise a transceiver 220 for requesting the retrieval of the computer-readable instruction stream from the server 200 and receiving the computer-readable instruction stream after is passes verification of the run-time security constraints.

Figure 4:
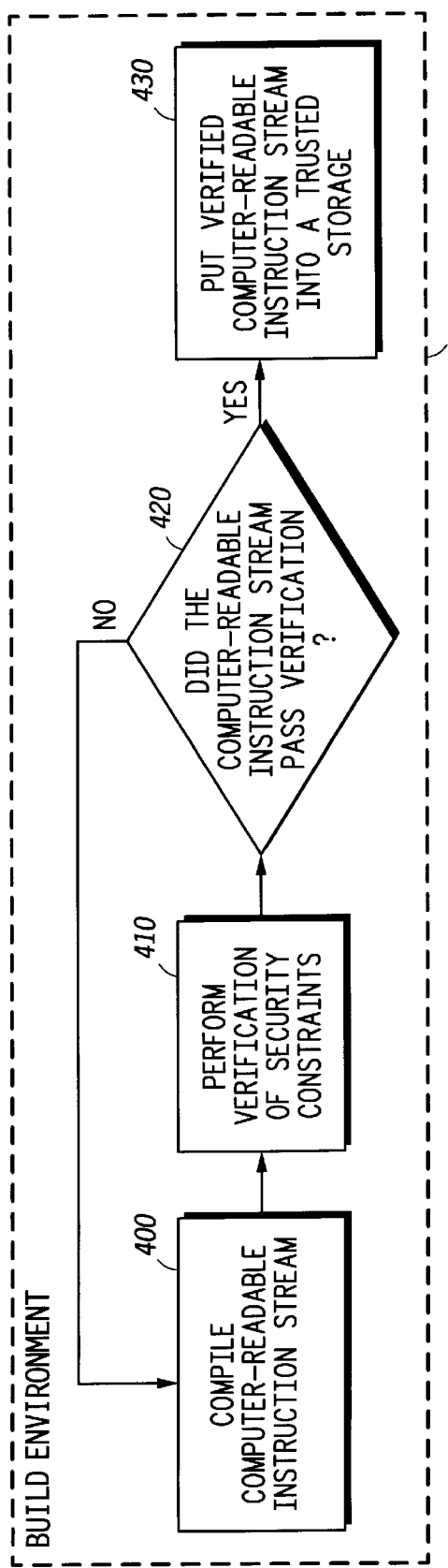
FIG. 4 is a flow chart of the build environment according to the preferred embodiment of the present invention.

FIG. 4 illustrates a flow chart representing a method of the present invention at the build environment 110. In operation, a programmer creates a computer-readable instruction stream in a usual fashion (e.g., editing source files and compiling the computer-readable instruction stream with a compiler) at step 400.

After the computer-readable instruction stream is created at step 400, a verification tool is used to perform all of the necessary security checks for the security constraints of the system 100 at step 410. Some of the security checks for the security constraints of the system 100 include checking access to regions of memory in the execution environment 150, checking access to files in the execution environment 150 and checking that a resource requirement does not exceed a limitation of the execution environment 150 (e.g., that the computer-readable instruction stream does not allocate more memory than is available in the execution environment).

After performing the steps of verification at step 410, it is determined whether the computer-readable instruction stream passes verification at step 420. If it is determined that the computer-readable instruction stream does not pass verification at step 420, then the computer-readable instruction stream is discarded and a new computer-readable instruction stream is created at step 400. If it is determined that computer-readable instruction stream passes verification at step 420, then it is preferably stored in the "trusted" storage device 140 at step 430, thus indicating that the computer-readable instruction stream will pass bytecode verification when executed in an execution environment 150.

It is important to note that step 430 is preferable, but is not required. Once it is determined at step 420 that the computer-readable instruction stream passes verification, it can be sent to the execution environment 150 for execution. Preferably, however, as shown in FIG. 4, once the computer-readable instruction stream passes verification at step 420, it is stored in a "trusted" storage device 140 for later retrieval by the execution environment 150. One of the primary advantages of storing the computer-readable instruction stream in the "trusted" storage device 140 after passing verification is that if the computer-readable instruction stream remains unmodified while in the "trusted" storage device 140 (determination that the computer-readable instruction stream has not been modified is described below), the execution environment 150 can retrieve and execute it multiple times without requiring the execution environment 150, or any other suitable environment or medium, to perform further verification of security constraints.

Preferably, the verification tool is implemented as a part of the build environment 110, in that the verification of all of the necessary security checks for the security constraints of the system 100 are automatically done as a part of building the computer-readable instruction stream. For example, the compiler 120 performs the verification step (step 410) automatically after compiling a program (step 400). In a further example, if the present invention is applied in the context of Java™ programming, the verification step (step 410) can be performed when creating a Java™ Archive (JAR) file.

The verification tool can also be implemented as a stand-alone tool such that verification of all of the necessary security checks for the security constraints of the system 100 are performed by a third party to an already existing computer-readable instruction stream. For example, a cellular network operator uses a tool to perform the verification steps on a computer-readable instruction stream before making it available for distribution to the customers on its network.

Further, the verification tool can also be implemented in a server 200, such that the verification of all of the necessary security checks for the security constraints of the system 100 are performed prior to the computer-readable instruction stream being transferred to the execution environment 150 as illustrated in FIG. 2. For example, the computer-readable instruction stream is compiled and stored into an "untrusted" storage 210 at the build environment 110. The contents of the "untrusted" storage 210 is subsequently transferred and stored on the server 200 until the execution environment 150 requests retrieval of the computer-readable instruction stream. Once the server 200 receives a request from the execution environment 150 to retrieve the computer-readable instruction stream, the server 200 uses the verification tool to perform all of the necessary security checks for the security constraints of the system 100 on the computer-readable instruction stream before delivery to the execution environment 150. If the computer-readable instruction stream passes verification, it is delivered to the execution environment 150 and preferably stored in the "trusted" storage device 140 for later use. As long as the computer-readable instruction stream remains unmodified in the "trusted" storage device 140, it bypasses future verification of the run-time security constraints when requested by the execution environment 150 in the future without risk of the computer-readable instruction stream having adverse affects on the execution environment 150.

It should be noted that the computer-readable instruction stream can be verified by the server 200 and placed in the "trusted" storage device 140 prior to receiving a request from the execution environment 150. As such, the execution environment 150 verifies the integrity of the "trusted" storage device 140 and retrieves the computer-readable instruction stream from the "trusted" storage device 140 directly.

An alternative to automatically transferring and storing the computer-readable instruction stream on the server 200, the computer-readable instruction stream could remain in the "untrusted" storage 210 on the build environment 110, or any other suitable location, until requested by the execution environment 150. After the execution environment 150 requests the computer-readable instruction stream from the server 200, the server 200 retrieves the computer-readable instruction stream from the "untrusted" storage 210 and verifies that the computer-readable instruction stream does not violate the security constraints of the execution environment 150. Once the computer-readable instruction stream successfully passes verification, the computer-readable instruction stream is transferred to the execution environment 150. Preferably, the computer-reactable instruction stream is also placed in a "trusted" storage device 140 alter passing verification in order to bypass future verification of the run-time security constraints when requested by the execution environment 150 in the future without risk of the computer-readable instruction stream having adverse affects on the execution environment 150.

Figure 5:
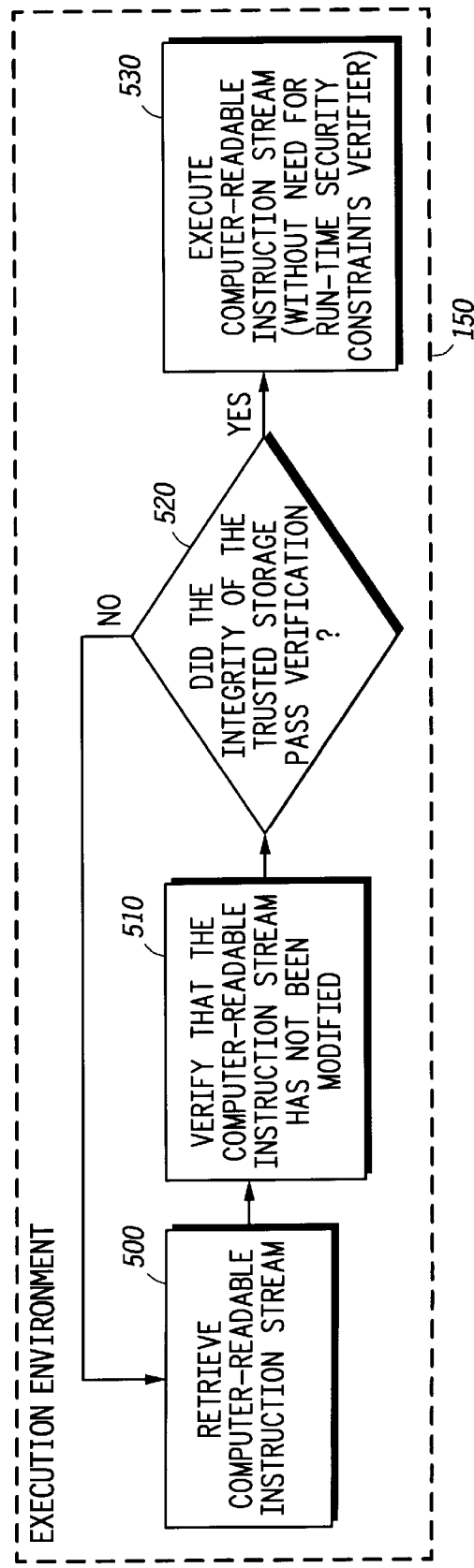
FIG. 5 is a flow chart of the execution environment according to the preferred embodiment of the present invention.

FIG. 5 illustrates a flow chart representing a method of the present invention in the execution environment 150. In operation, an execution environment 150 retrieves the "trusted" storage device 140, if the "trusted" storage device 140 is located remotely from the execution environment 150, having the computer-readable instruction stream. The execution environment 150 then verifies the integrity of the "trusted" storage device 140 (i.e., verify that the computer-readable instruction stream has not been modified after passing all of the necessary security checks for the security constraints of the system). For example, if the "trusted" storage device 140 is an archive with a digital signature or message digest attached, the archive is retrieved by the execution environment 150 in step 500 and the digital signature or message digest is checked for authenticity using cryptographic techniques, or any other appropriate techniques, as known in the art to verify that the computer-readable instruction stream in the archive has not been modified at steps 510 and 520.

If the computer-readable instruction stream is sent through a secure communication channel 300, such as a secure sockets layer (SSL), the secure communication channel 300 can detect if the computer-readable instruction stream has been modified while in the secure communication channel 300 using cryptographic techniques, or any other appropriate techniques, as known in the art. Therefore, the explicit step of verifying that the computer-readable instruction stream has not been modified (step 510) performed within the secure communication channel 300 and the explicit step of verifying the integrity of the trusted storage (step 520) is not applicable.

For some "trusted" storages device 140, however, verification of the "trusted" storage device 140 is not necessary. For example, a ROM is inherently "trusted" because the computer-readable instruction stream cannot be modified once stored (i.e., it is a write-once memory). As a result, if the execution environment 150 retrieves the computer-readable instruction stream from a ROM, the execution environment bypasses steps 510 and 520 and executes the computer-readable instruction stream upon retrieval at step 530. Thus, steps 510 and 520 are not required when the "trusted" storage device 140 is a ROM, or any other mechanism (e.g., write-once memories or mechanisms) that is inherently "trusted" because its contents cannot be modified once stored.

If the integrity of the "trusted" storage device 140 passes verification at step 520, the system 100 knows that the computer-readable instruction stream located in the "trusted" storage device 140 has previously passed the security verification process and has not been modified since such verification. As a result, the run-time security checks do not need to be performed on the computer-readable instruction stream prior to execution of the computer-readable instruction stream at step 530. The computer-readable instruction stream is therefore executed without these security checks, which is much more power and time efficient.

The present invention, in its broader aspects, is therefore not limited to the specific details, representative apparatus and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the invention.

I claim:

1. A method for reducing time and power requirements for executing computer-readable instruction streams in an execution environment having run-time security constraints comprising:

verifying that the computer-readable instruction stream does not violate the run-time security constraints of the execution environment;

storing the computer-readable instruction stream in a storage device;

retrieving the computer-readable instruction stream from the storage device;

verifying that the computer-readable instruction stream has not been modified; and executing one or more times the computer-readable instruction stream while bypassing verification of the run-time security constraints of the execution environment, the computer-readable instruction stream capable of being executed multiple times in the execution environment while bypassing verification of the run-time security constraints of the execution environment each time the instruction stream is executed, the verification bypass resulting from the verifying step determining that the computer readable instruction stream has not been modified.

2. The method according to claim 1 wherein the step of verifying that the computer-readable instruction stream does not violate the run-time security constraints of the execution environment and the step of storing the computer-readable instruction stream in a storage device are performed at a server remotely located from the execution environment.

3. The method according to claim 1 wherein the step of verifying that the computer-readable instruction stream does not violate the run-time security constraints of the execution environment and the step of storing the computer-readable instruction stream in a storage device are performed in a build environment remotely located from the execution environment.

4. The method according to claim 1 wherein the execution environment is a byte-code interpreted environment.

5. The method according to claim 1 wherein the storage device is a read-only memory.

6. The method according to claim 1 wherein the storage device is an archive containing the computer-readable instruction stream with a digital signature attached.

7. The method according to claim 1 wherein the step of verifying that the computer-readable instruction stream does not violate the run-time security constraints of the execution environment comprises checking access to regions of memory in the execution environment.

8. The method according to claim 1 wherein the step of verifying that the computer-readable instruction stream does not violate the run-time security constraints of the execution environment comprises checking access to files in the execution environment.

9. The method according to claim 1 wherein the step of verifying that the computer-readable instruction stream does not violate the run-time security constraints of the execution environment comprises checking that a resource requirement does not exceed a limitation of the execution environment.

10. A method for reducing time and power requirements for executing computer-readable instruction streams in an execution environment having run-time security constraints comprising:

verifying that the computer-readable instruction stream does not violate the run-time security constraints of the execution environment;

sending the computer-readable instruction stream to the execution environment via a secure communication channel; and executing the computer-readable instruction stream while bypassing verification of the run-time security constraints of the execution environment, the computer-readable instruction stream capable of being executed multiple times in the execution environment while bypassing verification of the run-time security constraints of the execution environment each time the instruction stream is executed, the bypass verification resulting from the verifying step determining that the computer readable instruction stream is unmodified.

11. An apparatus for reducing time and power requirements for executing computer-readable instruction streams in an execution environment having run-time security constraints comprising:

a security constraints verifier for verifying the run-time security constraints of the execution environment;

a storage device, coupled to the security constraints verifier, for storing the computer-readable instruction stream;

a storage device integrity verifier, coupled to the storage device, for verifying an integrity of the storage device to insure that the computer-readable instruction stream has not been modified; and a central processing unit, coupled to the storage device integrity verifier, for executing the computer-readable instruction stream while bypassing verification of the run-time security constraints of the execution environment, the central processing unit executing the computer-readable instruction stream multiple times while bypassing verification of the run-time security constraints of the execution environment, the verification bypass occurring upon the storage device integrity verifier determining that the instruction stream has not been modified.

12. The apparatus according to claim 11 wherein the security constraints verifier and the storage device are located in an build environment remotely located from the execution environment.

13. The apparatus according to claim 11 wherein the security constraints verifier and the storage device are located on a server remotely located from the execution environment.

14. The apparatus according to claim 11 wherein the storage device is an archive containing the computer-readable instruction stream with a digital signature attached.

15. The apparatus according to claim 14 wherein the storage device integrity verifier validates the digital signature's authenticity.

16. The apparatus according to claim 11 wherein the execution environment is a byte-code interpreted environment.

17. An apparatus for reducing time and power requirements for executing computer-readable instruction streams in an execution environment having run-time security constraints comprising, at the execution environment:

a receiver for retrieving a storage device having a computer-readable instruction stream that has passed verification of the run-time security constraints;

a storage device integrity verifier, coupled to the receiver, for verifying an integrity of the storage device; and a central processing unit, coupled to the storage device integrity verifier, for executing the computer-readable instruction stream while bypassing verification of the run-time security constraints of the execution environment, the central processing unit executing the computer-readable instruction stream capable of being executed multiple times while bypassing verification of the run-time security constraints of the execution environment each time the instruction stream is executed, the verification bypass occurring upon the storage device integrity verifier determining that the instruction stream has not been modified.

18. An apparatus for reducing time and power requirements for executing computer-readable instruction streams in an execution environment having run-time security constraints comprising, at the execution environment:

a read-only memory having a computer-readable instruction stream that has passed verification of the run-time security constraints; and a central processing unit, coupled to the read-only memory, for executing the computer-readable instruction stream multiple times while bypassing verification of the run-time security constraints of the execution environment during each subsequent execution of the instruction team after the instruction stream has passed verification.

19. A storage medium having a set of instruction stored thereon, the instructions when loaded into a microprocessor causing the microprocessor to perform the following functions:

receiving a computer-readable instruction stream that has passed a verification of the run-time security constraints;

verifying that the computer-readable instruction stream has not been modified after passing the verification of the run-time security constraints; and executing the computer-readable instruction stream multiple times while bypassing verification of the run-time security constraints of the execution environment every time the instruction stream is executed.

20. The storage medium according to claim 19 wherein the microprocessor further performs the following function:

storing the computer-readable instruction stream in a storage device after the step of verifying; and verifying that the computer-readable instruction stream has not been modified after the step of storing prior to re-executing the computer-readable instruction stream in the execution environment.

* * * * *